United States Patent
Maynard et al.

(10) Patent No.: US 11,092,665 B2
(45) Date of Patent: Aug. 17, 2021

(54) HIGH FREQUENCY GEO-LOCATION METHODS AND SYSTEMS

(71) Applicant: HYSKY TECHNOLOGIES, INC., Savannah, GA (US)

(72) Inventors: Charles C. Maynard, Savannah, GA (US); James V. Rootsey, Melbourne, FL (US); Philip L. Galpin, Omaha, NE (US); C. Paul Smith-Goodson, Cedar Park, TX (US); Niles K. Chura, Metuchen, NJ (US)

(73) Assignee: HYSKY TECHNOLOGIES, INC., Savannah, GA (US)

( * ) Notice: Subject to any disclaimer, the term of this patent is extended or adjusted under 35 U.S.C. 154(b) by 333 days.

(21) Appl. No.: 16/248,918

(22) Filed: Jan. 16, 2019

(65) Prior Publication Data
US 2019/0219661 A1  Jul. 18, 2019

Related U.S. Application Data

(60) Provisional application No. 62/618,780, filed on Jan. 18, 2018.

(51) Int. Cl.
*G01S 5/02* (2010.01)
*G01S 5/00* (2006.01)
(Continued)

(52) U.S. Cl.
CPC .......... *G01S 5/0221* (2013.01); *G01S 5/0081* (2013.01); *G01S 5/021* (2013.01); *G01S 5/0215* (2013.01);
(Continued)

(58) Field of Classification Search
CPC ....... H04W 4/029; H04W 4/02; H04W 4/021; H04W 4/023; H04W 4/024; H04W 64/00;
(Continued)

(56) References Cited

U.S. PATENT DOCUMENTS 4,812,852 A   3/1989  Bent et al.
5,640,442 A   6/1997  Fitzgerald et al.
(Continued)

OTHER PUBLICATIONS

International Search Report and Written Opinion for PCT/US19/13747, dated Apr. 15, 2019.

*Primary Examiner* — Olumide Ajibade Akonai
(74) *Attorney, Agent, or Firm* — Womble Bond Dickinson (US) LLP

(57) ABSTRACT

The described disclosure presents embodiments of an efficient shortwave radio technique using a network of multiple sites located in and around an operating region (e.g., continental USA), calibrated distributed beacons, a detailed knowledge of ionospheric behavior, and sophisticated operational tools and software, that geo-locates targets without depending on satellites. The embodiments of the technique described herein, for example, accurately may locate a target by utilizing remote field units, a network of radio receive sites, receivers that accept and time stamp pertinent signals, demodulators that recognize and extract meaningful data from received signals, communications from all receive sites to a Network Operations Center (NOC), communications from NOC to field units to keep shortwave channel choices relevant and effective, and a processor within the NOC that analyzes and evaluates data.

28 Claims, 11 Drawing Sheets

(51) Int. Cl.
*G01S 5/06* (2006.01)
*G01S 5/04* (2006.01)
*G01S 11/02* (2010.01)
*H04W 64/00* (2009.01)
*H04W 4/02* (2018.01)
*H04W 4/029* (2018.01)

(52) U.S. Cl.
CPC .................. *G01S 5/04* (2013.01); *G01S 5/06* (2013.01); *G01S 5/0273* (2013.01); *G01S 5/0278* (2013.01); *G01S 11/02* (2013.01); *H04W 4/02* (2013.01); *H04W 4/029* (2018.02); *H04W 64/003* (2013.01)

(58) Field of Classification Search
CPC .. H04W 64/006; H04W 64/003; H04L 67/12; H04L 67/18; G01S 1/02; G01S 5/0081; G01S 5/0221; G01S 5/04; G01S 5/06; G01S 19/05; G01S 5/0036; G01S 5/02; G01S 5/14; G01S 19/072; G01S 5/00; G01S 5/0284; G01S 5/0215; G01S 11/02; G01S 5/0273; G01S 5/0278; G01S 5/08; G01S 5/021

USPC ........................... 342/458; 455/456.1, 456.2
See application file for complete search history.

(56) References Cited

U.S. PATENT DOCUMENTS

| | | | |
|---|---|---|---|
| 9,402,157 B1 | 7/2016 | Blaha, Jr. et al. | |
| 9,939,517 B2* | 4/2018 | Bauer | G01S 5/14 |
| 2002/0128020 A1 | 9/2002 | Carlson et al. | |
| 2004/0192353 A1 | 9/2004 | Mason et al. | |
| 2005/0275528 A1* | 12/2005 | Kates | H04W 52/0225 |
| | | | 340/539.22 |
| 2005/0275530 A1* | 12/2005 | Kates | G08B 25/009 |
| | | | 340/539.22 |
| 2008/0252422 A1* | 10/2008 | Dowla | G06K 7/10079 |
| | | | 340/10.1 |
| 2012/0244875 A1* | 9/2012 | Cardona | G01S 5/0252 |
| | | | 455/456.1 |
| 2016/0205502 A1* | 7/2016 | Parikh | H04W 4/02 |
| | | | 455/456.2 |
| 2017/0205492 A1* | 7/2017 | Jacklin | G01S 5/06 |
| 2018/0074161 A1* | 3/2018 | Rosenbaum | G01S 5/14 |
| 2019/0053003 A1* | 2/2019 | Cheung | H04W 4/30 |
| 2019/0159162 A1* | 5/2019 | Hassan | G01S 5/0027 |

* cited by examiner

HIGH FREQUENCY GEO-LOCATION METHODS AND SYSTEMS

CROSS-REFERENCE TO RELATED APPLICATIONS

This application is a Non-Provisional application, and claims priority to, and the benefit of, U.S. Provisional Application No. 62/618,780, filed Jan. 18, 2018, titled "High Frequency Geo-Location Methods and Systems," the full disclosure of which hereby is incorporated herein by reference in its entirety.

FIELD

This disclosure relates generally to wireless communication systems and methods and, more specifically geo-location of targets by wireless communications systems and associated methods.

BACKGROUND

The use of satellites to locate a variety of objects, track vehicles, and even position itself, has become so common that many are not aware that other geo-location methods exist. Satellite-based geo-location is not a unique technique relative to historical locating methods in that it uses a common triangulation technique that depends on visibility of three or more sources of signals, each having an accurately known location and each being precisely timed. It also requires an appropriately tuned antenna, stable receiver, and a programmed data processor. To actually geo-locate a unit with satellite-based techniques, however, requires not only a specific device on a cooperatively targeted object, vehicle, or person in order for it to succeed, but also requires an un-blocked, un-hacked, and un-spoofed satellite network. This latter requirement suggests that a satellite-based method or system of locating an arbitrary target may not be a reliable technique under unfriendly circumstances.

An operator can also track a target by using a technique that is a complementary inverse to the satellite triangulation-based method. This is called Time Difference of Arrival ("TDOA"). This technique uses three or more receive sites to receive RF signals (or noise) from a target, and then evaluates the different times the signal is observed at each of the receive sites. Its system diagram may look virtually like the satellite system block diagram, but instead of the remote unit performing the triangulation, the operational network is the one that triangulates. Of course, the target must emit something for the network to observe, whether it is a radio transmission or a noise burst. Then, the observer must have a technique to compute the exact time of arrival of that signal at each site in order to determine the geo-location of that radiated signal.

High frequency ("HF") radio propagates from one location to another by using various layers 600 in the ionosphere. These layers 600 are the following: the D layer, the E layer, the F1 layer and the F2 layer. The lower layers are more commonly available during the day and the upper levels during the night. When an HF signal is transmitted from one location to another hundreds of miles away, however, it may use a different layer than if the signal was going to a different direction. Thus, if three (3) receive sites receive the transmitted signal at different distances, then each of the receive sites may use a different ionospheric layer. So unless all receive sites obtain the data via the same ionospheric layer, the distance between a particular receive site and the transmitter may be ambiguous.

The accuracy of shortwave-based geo-location may be improved by including supplemental techniques such as horizontal direction finding (or beam pointing) using features of the multiple arrays located on each receive site. For example a typical site might create eight beams, each of which is forty-five (45) degrees apart from the adjacent ones. By measuring signal strength from the strongest beam and comparing it to the others, the angle of arrival of the signal may be determined and, thereby, the horizontal direction of the target based.

Yet another geo-location method that has been around for almost eighty (80) years is radar. Here, an observer emits a series of electromagnetic pulses in a known direction. As that string of pulses encounter an object, a series of reflections (or echoes) are returned to the observer. The time interval that it takes for a pulse to go to the distant object, reflect off that object, and its echo to return, indicates exactly how far away the object is. By taking a sequence of measurements and noting whether the echo time is getting shorter, longer, or staying the same with each pulse, the observer can determine whether the target is moving toward, away, or around him.

A common technique (comparable to radar, but without a pulse being transmitted by the observer) is called monopulse tracking. In this case, two or more antennas at a single receive site monitor an incoming signal, and either the amplitude and phase of the two antenna signals are adjusted, or the antennas are pointed in such a direction to null out the target. This technique may accurately determine the direction from which a targeted signal originates, but it has difficulty or otherwise cannot determine the distance to that target.

SUMMARY

In view of the above, Applicant has recognized that because satellite-based geo-location requires very accurate times of transmission and reception, somewhat expensive clocks must be used in both transmitters and receivers. Shortwave radio may be a quick, simple, and inexpensive way of doing things, but using techniques that do not require expensive equipment makes shortwave even more advantageous. Applicant also has recognized that satellite-based geo-location networks have no beam pointing capability, while shortwave-based networks according to embodiments described herein have receive sites with directionally oriented beams and, therefore, may be used to supplement and enhance geo-location systems and methods which use beam pointing techniques rather than precise time of arrival.

Accordingly, Applicant discloses herein embodiments of systems and methods having good features of geo-locating using shortwave radio which may include 1) its signal reception capability that extends far beyond the line-of-site horizon and, therefore, can geo-locate over much wider areas than ground-based geo-location techniques, 2) shortwave radio that is independent of any local or national infrastructure and can survive unfriendly circumstances, and 3) power levels radiated by the tracked object that can be so low, and the signal so deeply encoded, that the signal is not readily detected, hacked or interfered with as with satellite-based or traditional line-of-sight locating techniques.

Further in view of the above, Applicant recognizes the need for a more reliable and protected method of geo-locating a remote field unit. Accordingly, embodiments of a shortwave radio communications technique and associated support methods, such as by making use of distributed shortwave antenna sites to gather time and position data for arbitrarily located remote units to pinpoint their location, are provided. Embodiments of the disclosure relate generally to geo-location of targets by wireless communications systems and associated methods, and include more specifically the use of shortwave radio in the 3 Megahertz (MHz) to 30 Megahertz (MHz) HF band to geo-locate targets that may be well-beyond the visible horizon.

Some embodiments of the disclosure described herein may be based on a two-way transceiver system, for example, that operates in the HF (shortwave) region of the radio spectrum. The advantage of this shortwave band may be that low power signals can travel thousands of miles and are virtually unaffected by hills, valleys, topography, weather, foliage or other obstructions that other frequency bands encounter. The historical disadvantage of shortwave is its limited bandwidth; fortunately, it is most useful for applications where small amounts of data need to be received from unpredictable locations such as in geo-location applications. Even so, some rules need to be followed for reliable operations, some of which are based on fundamental laws of physics for any communication system.

The embodiments of an HF geo-location system to determine a geo-location of a remote field unit includes HF shortwave receive sites, HF shortwave antenna arrays, a location unit known as remote field unit, and a network operating center (NOC).

In an embodiment, the HF shortwave receive sites may be positioned to substantially surround, and be distributed within, a selected area to be under surveillance. According to an embodiment of the present disclosure, each HF shortwave receive site may be positioned in a range between 500 and 1500 miles apart.

According to an embodiment, the shortwave antenna arrays may be positioned adjacent to the HF shortwave receive site. The shortwave antenna arrays may emit HF antenna array beams within the surveillance area.

In another embodiment, the location unit is also known as a remote field unit. The remote field unit may be positioned within the selected area to be under surveillance. The remote field unit may be located remote from the HF shortwave receive sites. The remote field unit may periodically radiate an HF signal in a selected HF shortwave radio band. The radiated HF signal may be detectable by the HF shortwave receive sites through the HF shortwave antenna arrays.

According to an embodiment of the present disclosure, the NOC gathers data received from the HF shortwave receive sites and control communications between (i) the HF shortwave receive sites through the HF antenna arrays and (ii) the remote field unit. The NOC may also include a data analyzer that receives data from the HF shortwave receive sites. The data analyzer may also identify an available HF shortwave frequency as a clear channel based upon the data received from the HF shortwave receive sites. The clear channel may be issued to the remote field unit. In another embodiment, a geo-location controller may determine a location of the remote field unit based upon the identified clear channel.

According to an embodiment of the present disclosure, the data analyzer includes a frequency analyzer. The frequency analyzer may identify HF shortwave frequencies as clear channels based upon the received data from the HF shortwave receive sites. The propagation analyzer may be configured to generate a propagation probability map of the selected area to be under surveillance.

In another embodiment, the selected area to be under surveillance is divided into sectors. A fixed-location beacon may be positioned within each sector. Each beacon transmits a test signal on an HF frequency in response to a command initiated by the propagation analyzer. The command may be transmitted by the HF shortwave receive sites through the HF shortwave antenna arrays. The transmitted test signals may include a propagation time being detected by the HF shortwave receive sites through the HF shortwave antenna arrays.

In another embodiment, the propagation analyzer may record the propagation time of the test signals traveling between the beacon and the HF shortwave receive sites. The propagation time may be used as a reference time to calibrate a distance between the field unit and the HF shortwave receive sites.

Some embodiments of systems and methods of the disclosure therefore, for example, may include the following:

1) A defined area over which HF transmitting remote units to be tracked. The defined area may have variations in obstructions, weather, and topography.

2) Field units that need to be located.

3) An array of HF receive sites that may surround and/or be integral to the area over which remote units will be tracked.

4) A set of directional antennas on each site capable of receiving signals from remote units in the operational area.

5) Multiple receivers connected to each directional antenna in sufficient quantity to handle all the range of frequencies that might be propagating at a particular time.

6) A master control center that monitors all propagating frequencies at any particular time throughout the day and the night.

7) A master control center that continually issues a stream of frequencies to remote units throughout the coverage area, informing them of the frequencies which will be listened to by the receive sites.

8) A master control center with a capability to issue a command to any field unit to transmit a designated signal for immediate geo-location.

9) Devices assigned to monitor the received signal level at the output of every antenna and/or beam on each and every site.

10) An algorithm on each and every site that uses the relative signal strength from at least three separate beams to identify the incoming signal source and then determine a precise direction of arrival of the remote unit's signal.

11) A means to rapidly couple the output of each site's algorithm output to the master control center.

12) A rapid computational method at the master control center to efficiently combine the time of arrival and direction of arrival of any particular remote unit's transmission from at least three sites, and compute and issue the precise location of that unit.

13) A rapid computational method at the master control center that analyzes two or more sequential locations to define the instantaneous direction and velocity of a moving, tracked field unit.

Some embodiments of the disclosure also may include features to enhance the effectiveness of low power, long distance geo-location operations, because the characteristics of the ionosphere may be so dynamic that only portions of the shortwave band propagate over long distances at any particular time. Two analytical operations within the NOC software evaluate the environment and assign frequencies to remote units. The first is the Propagation Analysis Program ("PAP") and the second is the Frequency Analysis Program ("FAP").

The PAP has two parts. The first takes published shortwave propagation data from standard publicly available sources such, and sets up a propagation probability map for the entire surveillance area for each of the operating sites. It then tabularizes and stores the data. In parallel, it analyzes specific signals generated by and observed from strategically placed beacons (field-unit-like devices that periodically issue identifying signals).

For operations wherein the United States of America ("USA") is the surveillance area, embodiments of systems and methods of the disclosure may, as an example, divide the surveillance area into forty-four major sectors, each approximately 5 degrees by 5 degrees in size; thus each sector roughly covers an area equivalent to an average state. Within each sector that might have an operational field unit, the geo-location network includes a transmitter that operates like a field unit. On scheduled intervals, each beacon is commanded by the network operating center ("NOC") to transmit briefly on each of the frequencies assigned to the geo-location network by the Federal Communications Commission ("FCC"). A simple pulse is sent from this field unit at a specific time (e.g., with equal to or better than microsecond accuracy), and the time of arrival at three or more destinations is subsequently measured to equal to or better than microsecond accuracy. These start/finish times are sent to the NOC where they are analyzed to determine location, based on a combination of signal strength and time of arrival.

All receive sites are monitored and each site that receives data from that beacon is so noted. When the scan is complete, the NOC records which frequencies were received by the greatest number of sites, and the NOC publishes those frequencies as ones to be used for the next series of geo-location transmissions for that sector. The NOC also computes the propagation time for each of the receptions from the pre-located beacon and stores this data as a reference for calibrating field unit distance from the receive site.

Because some embodiments of systems and methods of the disclosure are based on shortwave radio transmission, these systems and methods may geo-locate a target far beyond the horizon, such that the disclosed embodiments of systems and methods are as nationally pertinent and as accurate as satellite-based geo-location.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Figure 1:
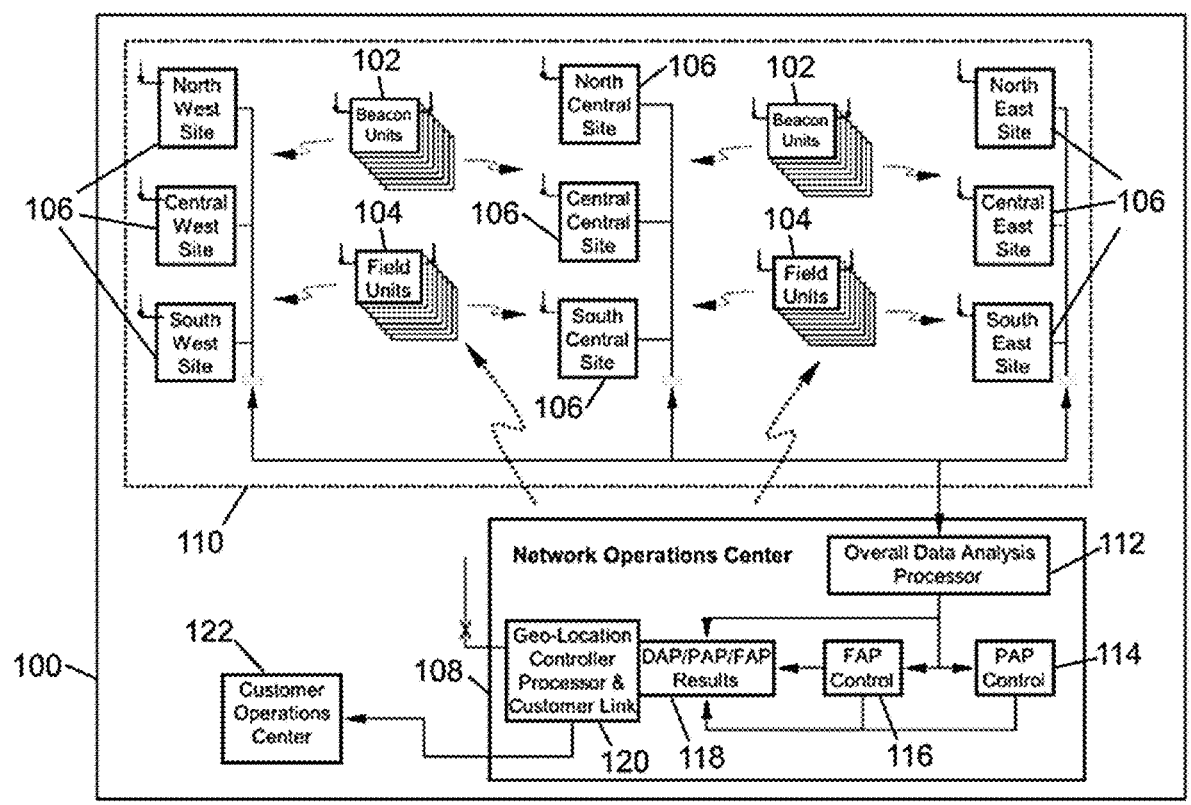
FIG. 1 is a block diagram of a shortwave radio geo-location network, in accordance with example embodiments of systems and methods of the disclosure.
Figure 2:
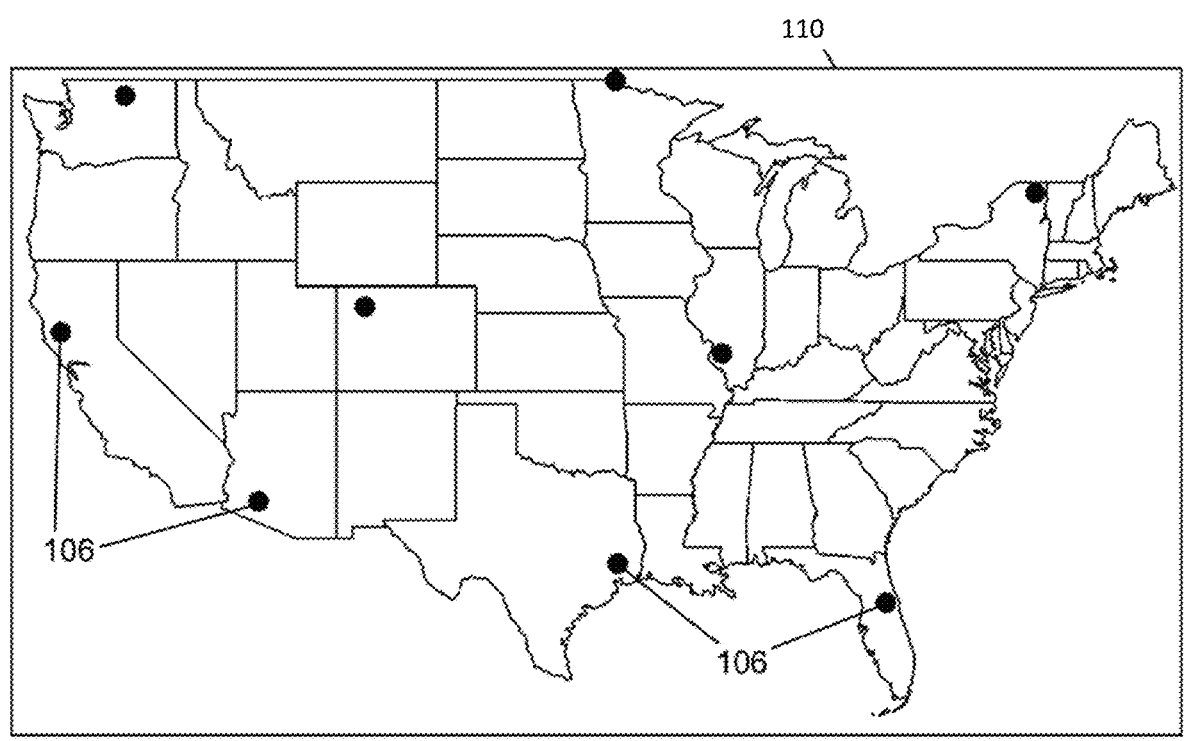
FIG. 2 is a schematic diagram which illustrates an example distribution of receive sites, using the continental United States as an example, in accordance with example embodiments of systems and methods of the disclosure.

In various embodiments of the present disclosure, an HF geo-location system 100 for determining a geo-location of a remote field unit 104 includes a plurality of shortwave receive sites 106, one or more shortwave antenna arrays, a location unit 104, and a network communications and operations controller 108 as illustrated in FIG. 1. The plurality of shortwave receive sites 106 are positioned to substantially surround, and be distributed within, a selected area 110 to be under surveillance as illustrated in FIG. 2. According to an embodiment of the present disclosure, the selected area 110 may have a variation in topography, weather, and obstructions. In another embodiment, each of the plurality of shortwave receive sites 106 may be positioned in a range between 500 and 1500 miles apart. The receive sites 106 may surround and are integral to the surveillance area 110.

FIG. 2, for example, shows a typical distribution of receive sites 106, using the continental United States as an example of a surveillance area 110. Receive sites 106 are placed both surrounding and integral to the surveillance area 110. Preferably, the receive sites 106 are distributed such that any signal can be received within one thousand miles of the source, thereby eliminating the need for multi-hop shortwave links. For example, as shown in FIG. 2, nine sites could be distributed across a surveillance area 110 consisting of the continental United States, such that any signal can be received within one thousand miles of the source.

Figure 5:
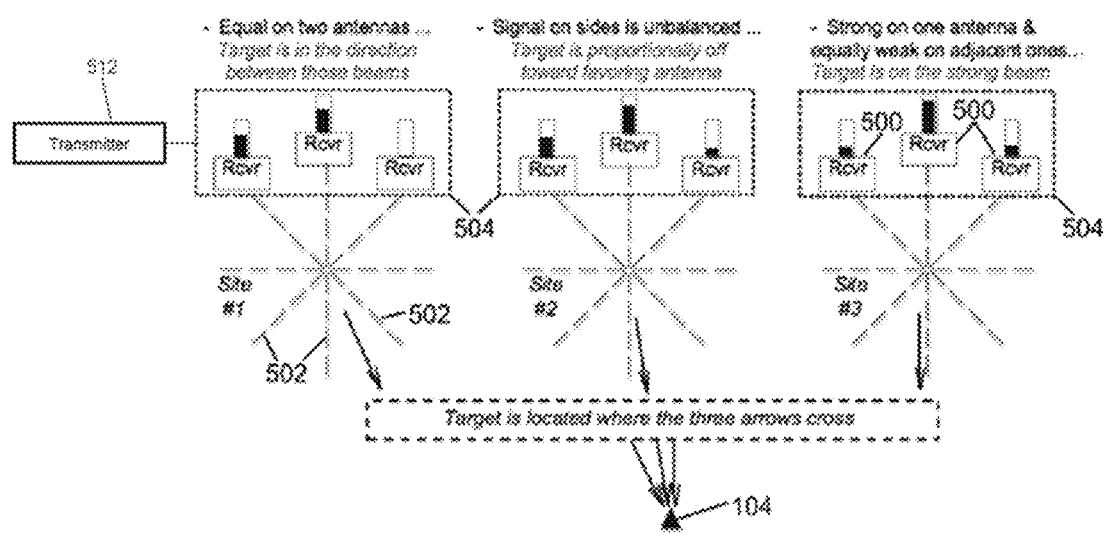
FIG. 5 is a schematic diagram which illustrates geo-location enhancement by beam pointing utilized by receive sites in accordance with example embodiments of systems and methods of the disclosure.

In some embodiments, the one or more shortwave antenna arrays 504 are positioned adjacent each shortwave receive site 106 and in communication with one or more transmitters 512 to produce a plurality of antenna array beams 502 therefrom within the selected area 110 to be under surveillance as illustrated in FIG. 5.

According to an embodiment of the present disclosure, the location unit 104 may be positioned within the selected area 110 to be under surveillance and remote from each of the plurality of shortwave receive sites 106. The location unit 104 defines a remote field unit 104. The remote field unit 104 may also be positioned to periodically radiate an HF signal in a selected shortwave radio band detectable by one or more of the plurality of shortwave receive sites 106 through the one or more shortwave antenna arrays 504.

FIG. 1 illustrates a block diagram of a shortwave radio geo-location system 100 in accordance with example embodiments of the disclosure. In one embodiment of the disclosure, remote beacon 102 units, as will be understood by those skilled in the art, and remote field units 104, as will be understood by those skilled in the art, communicate with three or more receive sites 106 within a designated surveillance area 110. The location of the field units 104 is tracked within the surveillance area 110 by the geo-location system 100.

In another embodiment, the network communications and operations controller defines a network operating center (NOC) as illustrated in FIG. 1. The NOC 108 serves as a master control center that determines the location of all field units 104 throughout the surveillance area 110.

Figure 1A:
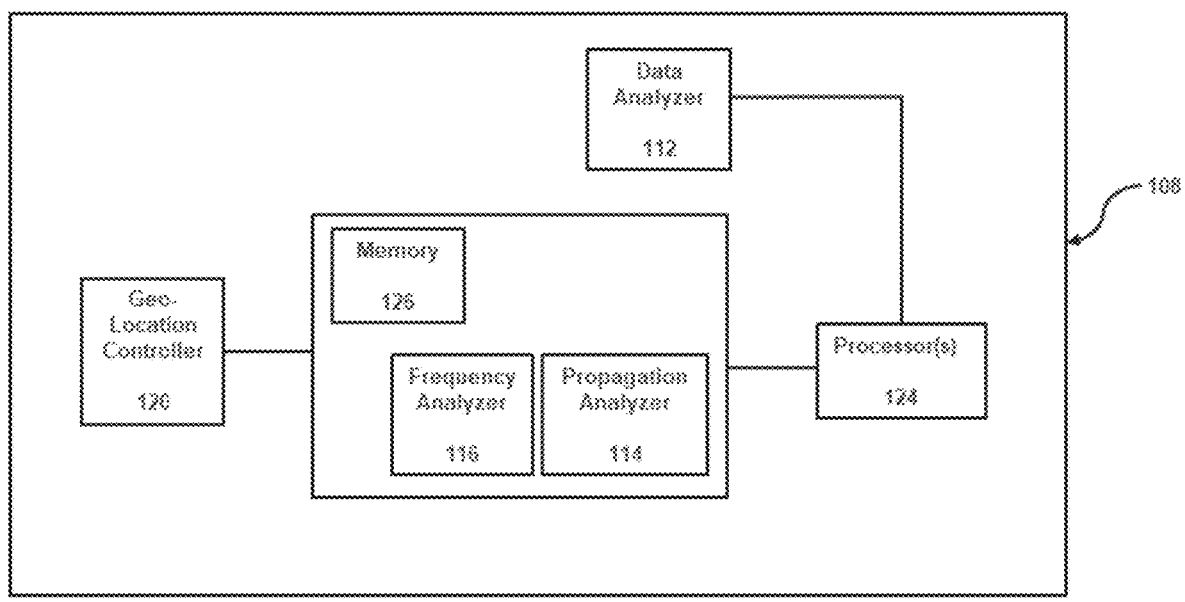
FIG. 1A is a schematic diagram of components within NOC, in accordance with example embodiments of the systems and methods of the disclosure.

The NOC 108 may be positioned to gather data received from the plurality of shortwave receive sites 106 and control communications between (i) the plurality of shortwave receive sites 106 through the plurality of antenna arrays 504 and (ii) the remote field unit 104. According to an embodiment of the present disclosure, the NOC 108 includes a data analyzer 112 positioned in communication with one or more processors 124 to receive the data from the plurality of shortwave receive sites 106 as shown in FIG. 1A. FIG. 1 shows Overall Data Analysis Processor 118 as an embodiment of the data analyzer 118. The data communicated to the NOC 108 from the receive sites 106 is received by the overall data analysis processor 112.

The NOC 108 further includes a non-transitory memory 126 positioned in communication with the one or more processors 124 to store one or more computer programs 114, 116 therein as illustrated in FIG. 1A. In an embodiment, the NOC 108 may include a first set of the one or more computer programs, defining a frequency analyzer 116, stored in the non-transitory memory 126 and operable on the one or more processors 124. As illustrated in FIG. 1, FAP Control 116 is an embodiment of the frequency analyzer 116 according to the present disclosure. The FAP Control 116 evaluates available channels and chooses the ones with no discernible transmissions/receptions and thereby declares them as clear channels. The frequency analyzer 116 includes a set of instructions that, when executed by the one or more processors 124, cause the one or more processors 124 to perform the following operations: identifying one or more available shortwave frequencies as one or more clear channels in response to the data received from the plurality of shortwave receive sites 106 through the data analyzer 112, the one or more clear channels being issued to the remote field unit 104.

According to some embodiments of the present disclosure, the NOC 108 also may include features to enhance the effectiveness of low power, long distance geo-location operations, because the characteristics of the ionosphere may be so dynamic that only portions of the shortwave band propagate over long distances at any particular time. Two analytical operations within the NOC 108 may be used to evaluate the environment and assign frequencies to remote units. The first analytical operation is a propagation analyzer 114 and the second analytical operation is frequency analyzer 116 as illustrated in FIG. 1.

The NOC 108 further includes a second set of the one or more computer programs, defining a propagation analyzer 114, stored in the non-transitory memory 126 and operable on the one or more processors 124. As illustrated in FIG. 1, PAP Control 114 is an embodiment of the propagation analyzer 114 according to the present disclosure. The propagation analyzer 114 may include a set of instructions that, when executed by the one or more processors 124, cause the one or more processors 124 to perform the following operations: (1) generating a propagation probability map of the selected area 110 to be under surveillance based upon shortwave propagation data acquired from one or more public sources, and (2) tabularizing and storing the shortwave propagation data, In parallel, it also analyzes specific signals generated by and observed from strategically placed beacons 102 (field-unit-like devices that periodically issue identifying signals).

In some embodiments, the NOC 108 may further include a geo-location controller 108 in communication with the memory 126 as shown in FIG. 1A. FIG. 1 shows Geo-Location Controller Processor and Customer Link 120 as an embodiment of the geo-location controller 188.

According to an embodiment of the present disclosure, results calculated by the Overall Data Analysis Processor 112, PAP 114, and FAP 116 are sent to the Geo-Location Control Processor and Customer Link 120. The Geo-Location Control Processor and Customer Link 120 uses these results to compute an accurate geo-location of remote field units 104. This geo-location of remote field units 104 data may be forwarded to an appropriate Customer Operations Center 122 for use by customers as shown in FIG. 1.

Figure 7:
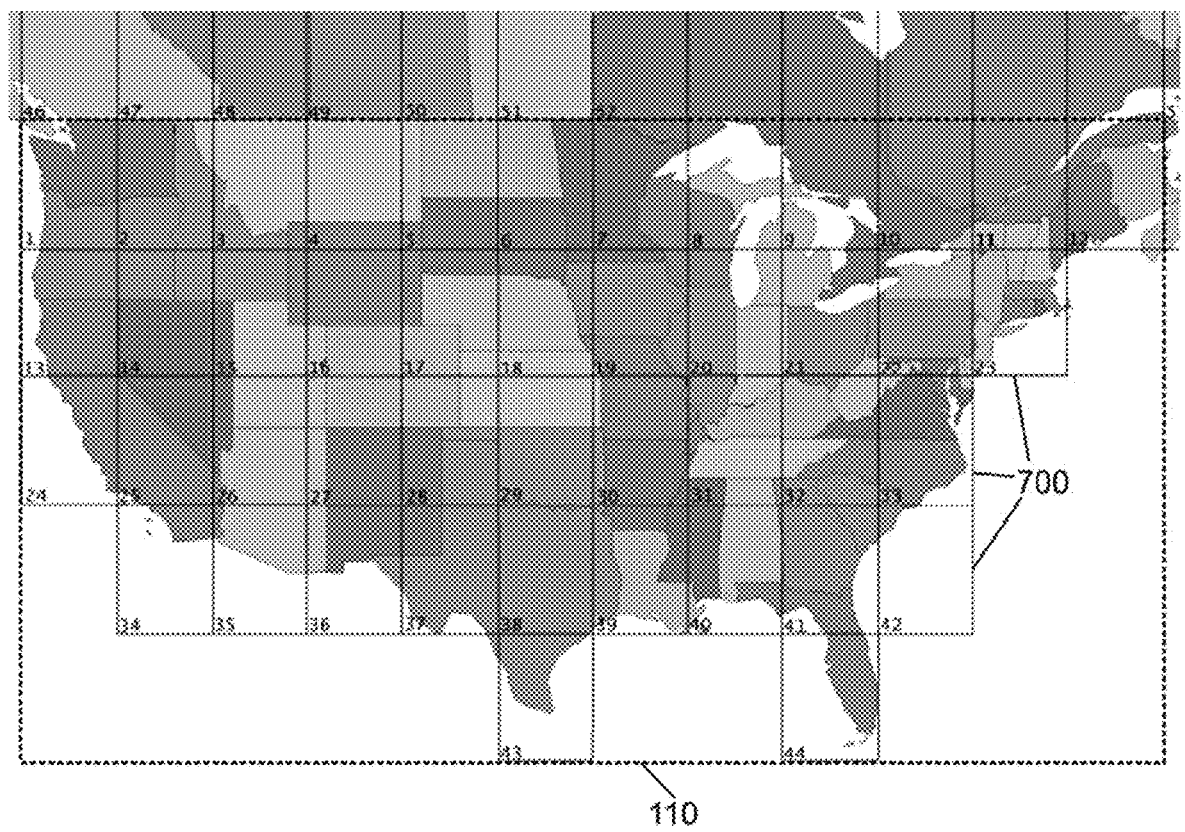
FIG. 7 is a schematic map diagram which illustrates a typical division of a surveillance area into sectors, using the continental United States as an example, in accordance with example embodiments of systems and methods of the disclosure.

As illustrated in FIG. 7, for example, the selected area to be under surveillance 110 may be divided into sectors 700 in accordance with example embodiments of the disclosure. By dividing the surveillance area 110 into sectors 700, the accuracy of shortwave-based geo-location measurements may be enhanced. By way of example, the surveillance area 110 of the continental United States has been divided into forty-four primary sectors 700. Each of these sectors 700 measure approximately five degrees by five degrees in size, roughly covering the area equivalent to the average state. Each of those sectors 700 may be further divided into sub-sections. Within each sector that might have an operational remote field unit 104, the geo-location system includes fixed-location unit defining a beacon 102.

According to an embodiment, on scheduled intervals, each beacon 102 is commanded by the propagation analyzer 114 within the NOC 108 to transmit briefly on each of the frequencies assigned to the geo-location network by the Federal Communications Commission ("FCC"). The command may be transmitted by the plurality of shortwave receive sites through the plurality of shortwave antenna arrays, A simple pulse is sent from the beacon 102 at a specific time (e.g., with equal to or better than microsecond accuracy), and the time of arrival at three or more shortwave receive sites is subsequently measured to equal to or better than microsecond accuracy. The propagation analyzer 114 may record the propagation time of the plurality of test signals traveling between the beacon and the plurality of shortwave receive sites.

These start/finish times are sent to the NOC where they are analyzed to determine location, based on a combination of signal strength and time of arrival. The propagation time between the beacon and the plurality of shortwave receive sites may be used as a reference time to calibrate a distance between the field unit and the plurality of shortwave receive sites.

Each sector 700 or sub-section that are in the surveillance area 110 where target field units 104 need to be tracked contain a precisely located beacon 102. On scheduled intervals, each beacon 102 is commanded by the NOC 108 to transmit briefly on each of the frequencies assigned to the geo-location network by the FCC. All receive sites 106 are monitored and each site that receives data from that beacon 102 is so noted. When the scan is complete, the frequency analyzer 116 receives and records which frequencies associated with the received test signals transmitted by the beacon were received by the greatest number of receive sites 106, and publishes those frequencies as ones to be used for the next series of geo-location transmissions for that sector 700.

Figure 6:
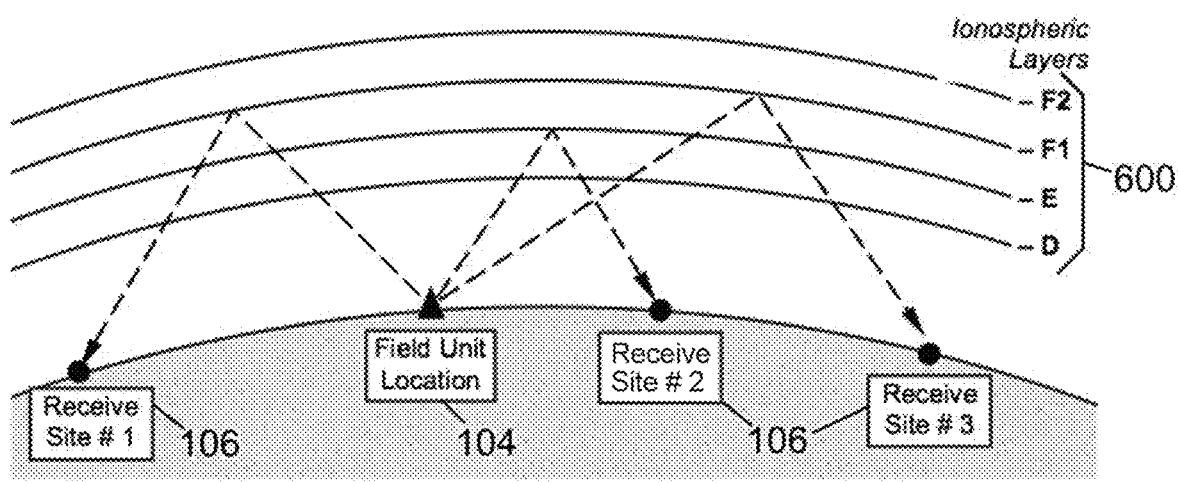
FIG. 6 is a schematic diagram which illustrates variations in shortwave path length for different ionospheric layers, in accordance with example embodiments of systems and methods of the disclosure.

FIG. 6 illustrates shortwave path length variations for different ionospheric layers 600. For operational calibration tests, test signals are issued by beacons 102 as often as needed both day and night. The signals from these beacons 102 are detected by the receive sites 106, i.e., Receive Site #1, Receive Site #2, Receive Site #3, and used to calibrate and validate shortwave path length predictions. Time-tagging signals as they are transmitted by the beacons 102 and received at the receive sites 106 (prior to sending to the NOC 108) calibrates shortwave-based path length accurately. Since two or more receive sites 106 receiving same frequency within one-hop radii will most often use same ionospheric layer 600 regardless of direction or distance, by proper management and beacons 102 calibration, the TDOA approach will indeed offer an accurate prediction of the field unit's 104 geo-location.

According to another embodiment of the present disclosure, each shortwave receive site 106 includes one or more receivers 500 as illustrated in FIG. 5. The receivers 500 are coupled to the one or more shortwave antenna arrays 504 to receive an HF signal transmitted by the remote field unit 104 through the one or more shortwave antenna arrays 504. In an embodiment, the HF signal is transmitted at unpredictable intervals. The one or more receivers 500 may be positioned in communication with one or more processors 510.

Figure 5A:
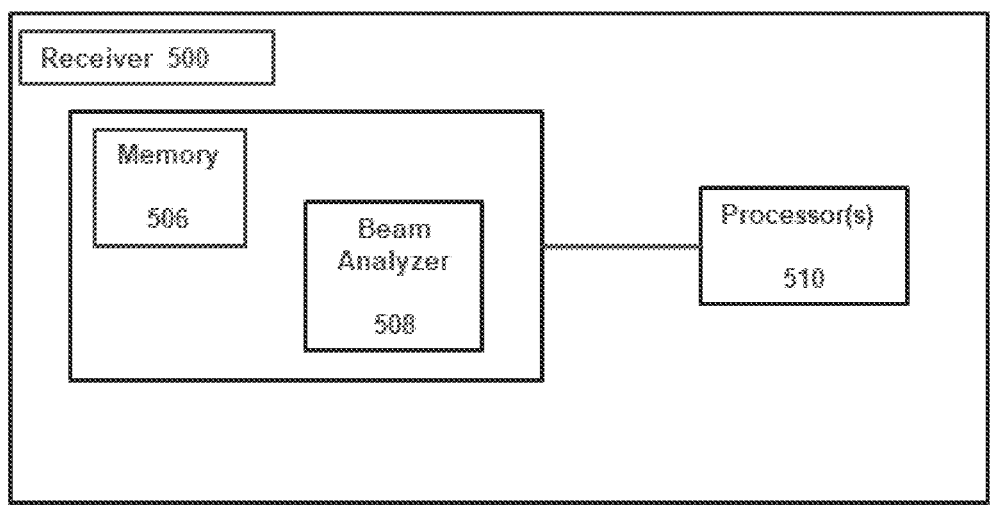
FIG. 5A is a schematic diagram which illustrates components of a receiver, in accordance with example embodiments of the systems and methods of the disclosure.

Each shortwave receiver site 106 may also include a non-transitory memory 506 positioned in communication with the one or more processors 510 to store one or more computer programs 508 therein as illustrated in FIG. 5A. Each shortwave receiver site 106 further includes one or more computer programs, defining a beam analyzer 508, stored in the non-transitory memory 506 and operable on the one or more processors 510. The beam analyzer 508 includes a set of instructions that, when executed by the one or more processors 510, cause the one or more processors 510 to perform the following operations: (1) determining a signal level in response to the received signal detected by at least three of the plurality of antenna beams 502 produced by the one or more shortwave antenna arrays 504; and (2) calculating an angle of arrival of the received signal in response to the determined signal level, wherein the angle of arrival determines direction of arrival of the received signal.

Figure 4:
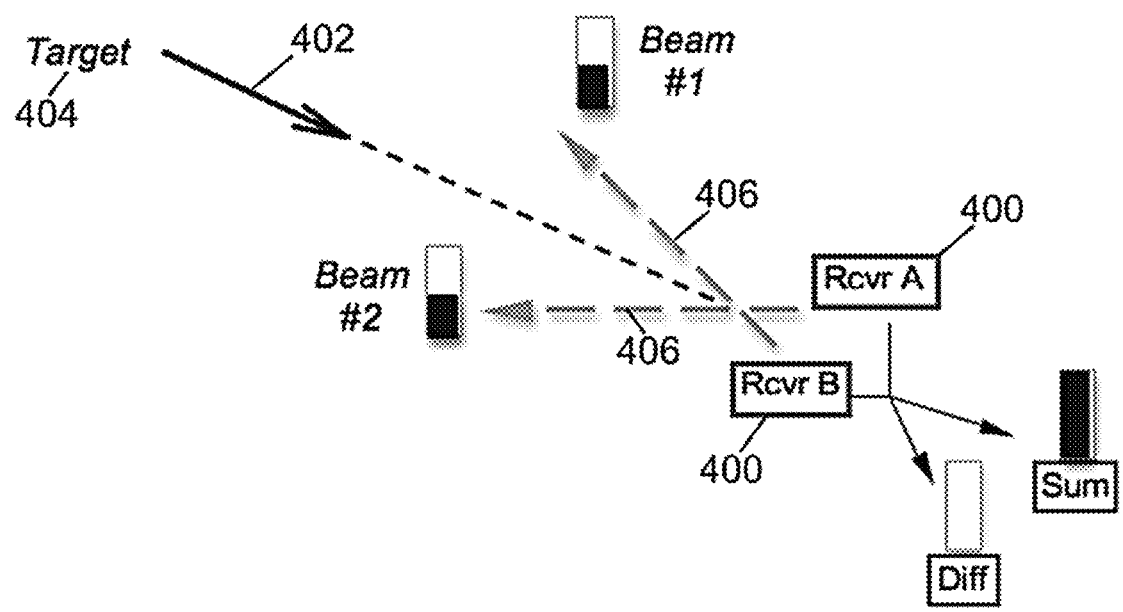
FIG. 4 is a schematic diagram which illustrates a prior art process called monopulse tracking, used for supplemental accuracy verification.

FIG. 4, for example, illustrates a common historical technique called monopulse tracking. In this case, two or more antennas 400 at a single receive site 106 monitor an incoming signal 402 from a target 404. Either the amplitude and phase of the two antennas' 400 beams 406 are adjusted, or the antennas 400 are pointed in such a direction to null out the signal 402 from the target 404. This technique accurately determines the direction from which a targeted signal 402 originates. However, this technique alone cannot determine the distance to the target 404. To determine the distance requires that either an accurate time-of-transmit indication comes with that signal 402, or two or more receive sites 106 operate in this mode. Although this technique is of itself in the public domain, it may be used within certain embodiments of this disclosure as a supplemental accuracy verification method. In another embodiment, two or more shortwave antenna arrays 504 may be positioned adjacent each shortwave receive site 106 tracks the HF signal transmitted by the remote field unit 104. The plurality of antenna array beams 502 produced by the two or more shortwave antenna arrays 504 may be directive. The plurality of directive antenna beams 502 are directed towards the tracked HF signal. The two or more shortwave antenna arrays 504 are pointed in such a direction to null out the HF signal. The location of the null out HF signal determines an angle of direction of the remote field unit 104.

According to another embodiment of the present disclosure, the plurality of directive antenna array beams 502 produce a plurality of antenna array beam signals. The plurality of the antenna array beam signals may be transmitted to the geo-location controller 120 via a link connecting each of the shortwave receive site 106 and the geo-location controller 120. The geo-location controller 120 may adjust an amplitude and a phase of the plurality of the antenna array beam signals to null out the signal. The location of the null out HF signal may determine the angle of direction of the remote field unit 104.

In another embodiment, three or more shortwave receive sites 106 transmit time arrival data and direction of arrival data to the geo-location controller 120 in response to the received HF signal generated by the remote field unit 104. The time arrival data may be equal to or better than microsecond accuracy. The geo-location controller 120 is configured to determine the location of the remote field 104 unit based upon the time arrival data and the direction of arrival data.

Figure 3:
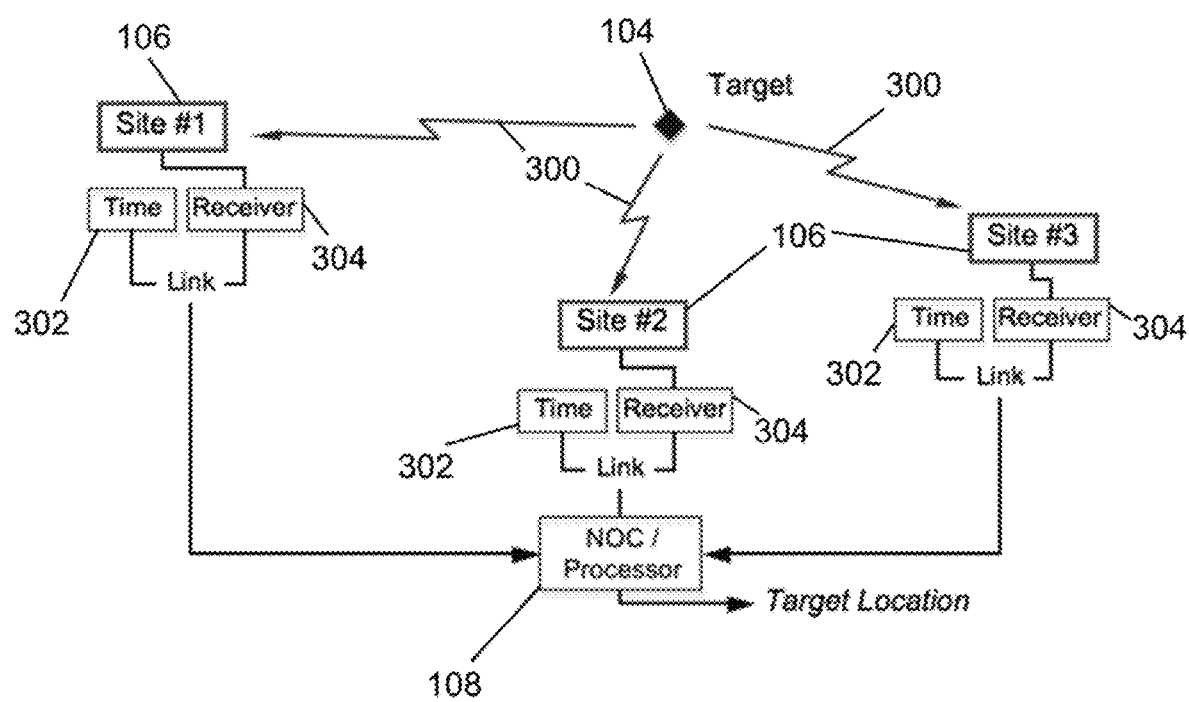
FIG. 3 is a schematic diagram which illustrates a system and method to geo-locate a remote field unit that is the complement (inverse) of the satellite triangulation-based method called Time Difference of Arrival (TDOA), in accordance with example embodiments of the disclosure.

FIG. 3, for example, shows a way to geo-locate a remote field unit 104 that is the complement (inverse) of the satellite triangulation-based method called Time Difference of Arrival (TDOA). Three or more receive sites 106 receive a signal 300 (such as a shortwave signal or an equivalent noise burst) from a target field unit 104. Each receive site 106 links and sends time arrival data 302 and direction of arrival data 304 to the NOC 108. The time arrival data 302 is preferably with equal to or better than microsecond accuracy. The NOC 108 evaluates the linked time arrival data 302 and direction of arrival data 304 observed at each of the receive sites 106 to compute the precise location of the field unit 104. Diagrammatically, this is virtually a satellite geo-location block diagram, but instead of the field unit 104 performing the triangulation, the NOC 108 is the one who triangulates. In this scenario, the target field unit 104 must emit a signal 300 for the NOC 108 to observe, and the NOC 108 must have a technique to compute the exact time of arrival of that signal 300 from each receive site 106 in order geo-locate the source.

In another embodiment, the remote field unit 104 may include (a) either, a desired target expected to be detected to define a friendly remote field unit 104 or (b) a target not expected to be detected to define an unfriendly remote field unit 104. The remote field unit 104 may travel from a first location to a second location within the selected area being under surveillance. The remote field unit 104 may transmit a signal to the plurality of shortwave receive sites from the first location and the second location. The received signal associated with the first location and the second location of the traveling remote field unit 104 being communicated to the data analyzer 112. The data analyzer 112 determines an instantaneous direction and velocity of the traveling remote field unit 104. In another embodiment, a rapid computational method at the master control center that analyzes two or more sequential locations to define the instantaneous direction and velocity of a moving, tracked field unit 104.

The beacons 102 are remote units similar to field units 104 which periodically issue identifying signals to assist the geo-location system 100. Each receive site 106 collects data from the communications sent by the beacons 102 and field units 104 in sufficient detail and quantity that, when forwarded to the network operating center (NOC) 108, enable the NOC 108 to determine the precise location of each and every field unit 104. This location data is then forwarded to appropriate customers.

FIG. 5, for example, illustrates an embodiment of one method for geo-location enhancement by beam 406 pointing to be utilized by receive sites 106. In this embodiment, the receive sites 106 associated with this disclosure do not consist simply of a single antenna 500, but rather each has an antenna array 504 of multiple antennas 500, which is capable of operating with multiple beams 502. Each antenna 500 is directional, and has associated receivers 500 able to receive any signals from within the range of frequencies that might be propagating from the remote field unit 104 targets. For example, the first receive site 106 shown has an equal signal 300 detected by each antenna's beam 502, therefore the target field unit 104 must be in the direction between those two beams 502. The second receive site 106 shows a signal 300 that is unbalanced towards one antenna's beam 502, therefore the target is in the direction proportionally towards the favoring antenna's beam 502. The third receive site 106 shows a signal 300 that is strong on one antenna's beam 502, and equally weak on the adjacent ones, therefore the target must be directly in line with the strongest beam 502. With this capability, and given sufficient margin in the link, data obtained by TDOA and monopulse techniques are further refined by comparing relative signal strengths in adjacent beams. This data can be sent to the NOC 108, which can compare the data from the three receive sites 106 to determine the exact location of the target field unit 104.

FIG. 6 illustrates shortwave path length variations for different ionospheric layers 600. For operational calibration tests, test signals are issued by beacons 102 as often as needed both day and night. The signals from these beacons 102 are detected by the receive sites 106, i.e., Receive Site #1, Receive Site #2, Receive Site #3, and used to calibrate and validate shortwave path length predictions. Time-tagging signals as they are transmitted by the beacons 102 and received at the receive sites 106 (prior to sending to the NOC 108) calibrates shortwave-based path length accurately. Since two or more receive sites 106 receiving same frequency within one-hop radii will most often use same ionospheric layer 600 regardless of direction or distance, by proper management and beacons 102 calibration, the TDOA approach will indeed offer an accurate prediction of the field unit's 104 geo-location.

FIG. 7, for example, illustrates an example of how a surveillance area 110 might be divided into sectors 700 in accordance with example embodiments of the disclosure. By dividing the surveillance area 110 into sectors 700, the accuracy of shortwave-based geo-location measurements may be enhanced. By way of example, the surveillance area 110 of the continental United States has been divided into forty-four primary sectors 700. Each of these sectors 700 measure approximately five degrees by five degrees in size, roughly covering the area equivalent to the average state. Each of those sectors 700 may be further divided into sub-sections.

The NOC 108 also computes the propagation time for each of the receptions from the pre-located beacon 102, and stores this data as a reference for calibrating field unit 104 distance from the receive site. Each beacon 102 offers an accurate calibration of the ionospheric layers 600 and their impact on time delay from within these sectors 700 or subsectors, improving the accuracy of geo-location within the sector 700 or subsector.

Figure 8:
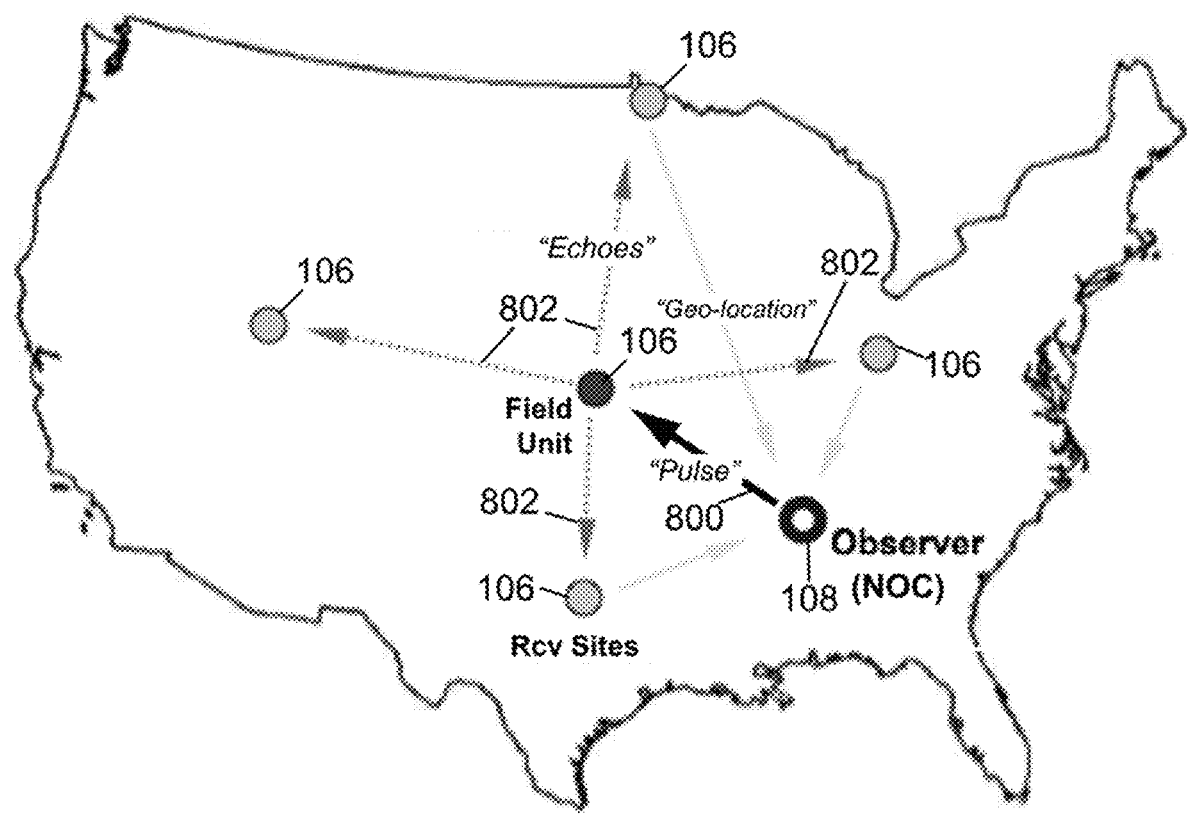
FIG. 8 is a schematic map diagram which illustrates a technique whereby radar can be simulated, in accordance with example embodiments of systems and methods of the disclosure.

FIG. 8, for example, shows a technique whereby radar can be simulated in accordance with example embodiments of the disclosure. In this case, the NOC 108 quickly issues a pulse burst signal 800 commanding any beacon 102 or remote field unit 104 to instantly respond with a prearranged shortwave echo signal burst 802. This echo signal burst 802 is then received by the receive sites 106. The data received by the receive sites 106 is instantly relayed to the NOC 108 and analyzed to determine both the current propagation characteristics of the ionosphere, and the precise location of the field unit 104.

Figure 9:
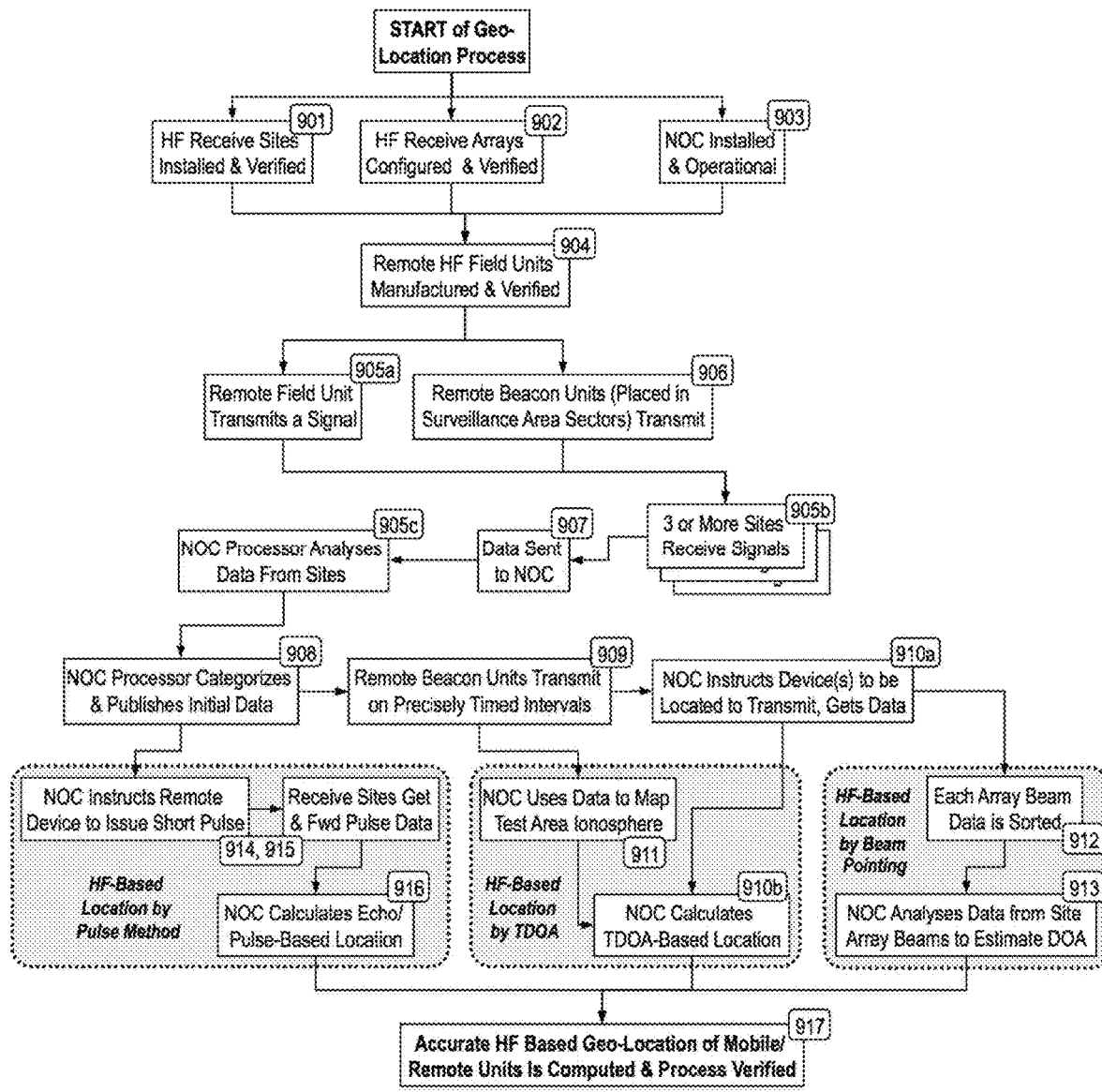
FIG. 9 is a block diagram of an example of a geo-location process in accordance with example embodiments of systems and methods of the disclosure.

FIG. 9 illustrates a block diagram for geo-location processes in accordance with example embodiments of the disclosure. According to one embodiment of the disclosure, there are several steps to initialize the geo-location system 100. In step 901, HF receive sites 106 are installed and verified throughout a surveillance area 110. These receive sites 106 may be distributed, for example, as shown in FIG. 2 to cover a surveillance area 110 consisting of the continental United States. Similarly, remote beacon 102 units may be installed and verified in sectors 700 throughout the surveillance area 110. These sectors 700 may be distributed, for example, as shown in FIG. 7 to cover a surveillance area 110 consisting of the continental United States. In step 902, HF antenna arrays 504 at the receive sites 106 are configured and verified. In step 903, the NOC 108 is installed and made operational. In step 904, remote HF units 104 are manufactured and verified to function with the geo-location system 100.

With the geo-location system 100 configured and installed, initial data can be collected. In step 905a, a remote field unit 104 transmits an HF signal. In step 906, the remote beacon 102 units also transmit HF signals. In step 905b, three or more of the receive sites 106 receive the HF signals from the field unit 104 and the beacon 102 units. In step 907, the data regarding these HF signals is transmitted to the NOC 108. In step 905c, the NOC 108 analyzes the data received from the receive sites 106. In step 908, the NOC 108 categorizes and publishes this initial data. After this initial data is published, one or more of the geo-location methods previously described may be used to determine the geo-location of a remote field unit 104.

In one embodiment of the present disclosure, geo-location is determined by a pulse method. Here, in step 914, the NOC 108 instructs the remote field unit 104 to issue a short, HF pulse. This is detected by multiple receive sites 106 in step 915 as shown in FIG. 4, which forward the received pulse data to the NOC 108. In step 916, the NOC 108 calculates the geo-location of the field unit 104 based on the data received by the receive sites 106.

In one embodiment of the disclosure, geo-location is determined by TDOA. Here, in step 909, the remote beacon 102 units transmit test signals at precisely timed intervals. These test signals are detected by the receive sites 106 as shown in FIG. 6, which transmit data to the NOC 108. In step 911, The NOC 108 uses this data to map the ionosphere and calibrate the shortwave-based path length accurately. The NOC 108 may then instruct a field unit 104 to be geo-located to transmit data, which is received by the receive sites 106 and forwarded to the NOC 108 in step 910a. Using the ionospheric data and path calibration with the received data, the NOC 108 calculates the TDOA-based geo-location of the field unit 104 in step 910b.

In one embodiment of the disclosure, geo-location is determined by beam pointing. After steps 909 and 910a, the transmission from the field unit 104 is detected by the antenna array 504 of multiple antennas 500 capable of operating with multiple beams 502 at each receive site 106, as shown in FIG. 5. The array beam data from each antenna's beam 502 is sorted in step 912. This is transmitted to the NOC 108 in step 913, which analyzes this data to estimate the direction of arrival of the signal from the field unit 104. This is used to calculate the geo-location of the field unit 104.

As described and illustrated herein, embodiments of systems and methods of the disclosure may include one or more of the following:

1) A collection of shortwave receive sites surrounding, and distributed within, the area under surveillance, each between 500 and 1500 miles apart. As an example, if the continental USA were to be the area under surveillance, the network might include nine receive sites.
2) Antenna arrays on each receive site that typically produce a) eight beams within any surveillance area, b) five beams on the sides of the surveillance area, and c) three beams on the corners of the surveillance area. For some surveillance areas, more or less beams may be appropriate.
3) A Network Operating Center (NOC) or equivalent that gathers and processes data from the receive sites.
4) An intelligent mobile or fixed location unit, herein referred to as remote field unit, which occasionally radiates a signal in the shortwave radio band.
5) An operating scenario in which a) the only the remote field unit radiates a signal, b) three or more receive sites acquire that signal, and c) a sophisticated processor analyses received data to geo-locate the object. This is in contrast to a satellite-based scenario in which three sources transmit and radiate signals and the tracked object receives that signal and computes location.
6) A process by which the surveillance area is divided into sectors, and a fixed-location unit (herein referred to as a "beacon") is placed within each sector to periodically radiate a series of shortwave frequencies according to those licensed to the operator by the FCC.
7) A process by which all receive sites are monitored and each of the sites that receives data from sector beacons sends that data to a NOC where it is to be analyzed and so noted in memory.
8) A processor in the NOC that records the beacon frequencies received by the greatest number of sites, and publishes those frequencies as ones to be used for the next series of geo-location transmissions for that sector.
9) A process by which beacons that are beyond the horizon send pulses at specific times (with equal to or better than microsecond accuracy) and the time of arrival at three or more receive sites is subsequently measured with equal to or better than microsecond accuracy.
10) A processor in the NOC that analyses and calibrates the data received from any remote field unit in its sector to accurately locate that unit, based on the time-difference of arrival (TDOA) at the received sites.
11) Corresponding beacon data that are used as reference points in a calculation that determines which ionospheric layer the signal traversed and therefore an accurate distance between each site and the target.
12) This disclosure includes an ability to geo-locate a remote item without depending on distance and time by each receive site using its multiple beam antenna arrays to determine the direction of arrival of received signals.
13) Multiple receivers coupled to different antenna beams receive the signals coming from remote targets and, with proprietary analytical software, enable the NOC to compare the relative signal strength in adjacent beams, and use that data to enhance geo-location accuracy.
14) Under appropriate circumstances, namely where those circumstances where high security and privacy are issues, the NOC issues a digital packet that quickly reaches and excites a particular remote field unit. This digital packet includes a command from the NOC for the remote unit to quickly respond on a particular shortwave frequency somewhere in the 3 MHz to 30 MHz band.
15) As a result of the action described in item 14 above, the remote field unit rapidly and briefly transmits the equivalent of a low-power "echo" on the commanded frequency.
16) As a result of the action described in item 15 above, an appropriate set of receive sites are instantaneously configured to receive such an "echo". Signals from the primary antenna beam output, and the outputs from antenna beams on either side of the principal receiving beam, are forwarded to the NOC.
17) The data received by the processes described in items 14, 15 and 16 enable to NOC to refine and enhance the accuracy of triangulated geo-location data by appropriately summing (peak analysis) and differencing (null analysis) with an on-site processor when combined with similar data from other receive sites.

In various embodiments, a method to determine a geo-location of a remote field unit using an HF geo-location system includes a) sending a command using a data analyzer 112 to a remote field unit 104 positioned within a selected area 110 substantially surrounded a plurality of shortwave receive sites 106 to be under surveillance to request that the remote field unit 104 to transmit an HF signal, b) transmitting the HF signal for the remote field unit 104, c) receiving the transmitted HF signal at a plurality of shortwave receive sites 106 through one or more shortwave antenna arrays 504 positioned adjacent the plurality of shortwave receive sites, d) communicating data associated with the received HF signal using a communication link to a geo-location controller 120 of a network operating center (NOC) 108, positioned remote from the plurality of shortwave receive sites 106, and e) determining a location of the remote field unit 104 responsive to the received HF signal data by use of the geo-location controller 120.

In some embodiments, the received HF signal data may include time arrival data and direction of arrival data of the remote field unit 104 as illustrated in FIG. 3. The time arrival data may be equal to or better than microsecond accuracy. The plurality of shortwave receive sites 106 may include at least three shortwave receive sites 106. The at least three shortwave receive sites 106 from the plurality of shortwave receive sites 106 may be used to determine the location of the remote field unit 104.

According to another embodiment of the present disclosure, the method may further include a) transmitting test signals at selected time intervals by use of a fixed-location unit defining a beacon 102. The beacon 102 may be positioned within each of a plurality of selected sectors, b) detecting the transmitted test signals at the plurality of shortwave receive sites 106 through the one or more shortwave antenna arrays 504 c) transmitting data associated with the detected test signals to a frequency analyzer 116 by use of the communication link, and d) generating an ionospheric layer map responsive to the received data associated with the detected test signals by use of the frequency analyzer 116.

In some embodiments, the method may further include a) refining the location of the remote field unit 104 based on the generated ionospheric layer map by use of the geo-location controller 120, b) calculating a propagation time of each of the transmitted test signals transmitted from the beacon 102 to the plurality of shortwave receive sites 106 by use of the geo-location controller 120, and c) storing the propagation time at the geo-location controller 120 to be used as a reference to calibrate the field unit 104 distance from the plurality of shortwave receive sites 106.

According to another embodiment of the present disclosure, the method may further include a) determining a signal level in response to the received HF signal detected by each of a plurality of antenna array beams 502 produced by the one or more shortwave antenna arrays 504 using a beam analyzer, b) comparing the signal level of each of the plurality of antenna array beams 502, c) calculating an angle of arrival of the received HF signal based on the signal level, d) communicating the angle of arrival data from each of the plurality of shortwave receive sites 106 to the geo-location controller 120 by use of the communication link, and e) refining the location of the remote field unit 104 based on the angle of arrival data from each of the plurality of shortwave receive sites 106 by use of the geo-location controller 120.

Another embodiment of the present disclosure, the method may further include a) issuing a command by use of the data analyzer 112 to the remote field unit 104 positioned within the selected area 110 to be under surveillance, wherein the command includes a digital packet, b) requesting that the remote field unit 104 to transmit a pulse in response to the issued command, c) transmitting the pulse for the remote field unit 104 on one or more frequencies. The one or more frequencies may be in a 3 Megahertz to 30 Megahertz frequency band, d) detecting the transmitted pulse at the plurality of shortwave receive sites 106 through the one or more shortwave antenna arrays 504, and e) forwarding data associated with the received pulse to the geo-location controller 120 by use of the communication link.

This application is a Non-Provisional application, and claims priority to, and the benefit of, U.S. Provisional Application No. 62/618,780, filed Jan. 18, 2018, titled "High Frequency Geo-Location Methods and Systems," the full disclosure of which hereby is incorporated herein by reference in its entirety.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A high frequency (HF) geo-location system to determine a geo-location of a remote field unit, the system comprising:
a plurality of HF shortwave receive sites positioned to substantially surround, and be distributed within, a selected area to be under surveillance, each of the plurality of HF shortwave receive sites being positioned in a range between 500 and 1500 miles apart;
one or more HF shortwave antenna arrays positioned adjacent each HF shortwave receive site and in communication with to emit a plurality of HF antenna array beams therefrom within the surveillance area;
a location unit positioned within the selected area to be under surveillance and remote from each of the plurality of HF shortwave receive sites thereby to define a remote field unit, the remote field unit also positioned to periodically radiate an HF signal in a selected HF shortwave radio band detectable by one or more of the plurality of HF shortwave receive sites through the one or more HF shortwave antenna arrays; and
a network communications and operations controller positioned to gather data received from the plurality of HF shortwave receive sites and control communications between (i) the plurality of HF shortwave receive sites through the plurality of HF antenna arrays and (ii) the remote field unit thereby to define a network operating center (NOC), the NOC further including a data analyzer positioned in communication with one or more processors to receive the data from the plurality of HF shortwave receive sites and identify one or more available HF shortwave frequencies as one or more clear channels in response to the data received from the plurality of HF shortwave receive sites and to be issued to the remote field unit, and a geo-location controller configured to determine a location of the remote field unit responsive at least in part to the identified one or more clear channels assigned to the remote field unit.

2. A system as defined in claim 1, wherein the data analyzer is further configured to generate a propagation probability map of the selected area to be under surveillance responsive to HF shortwave propagation data acquired from one or more public sources and to tabularize the HF shortwave propagation data; and wherein the geolocation controller further locates the remote field unit further responsive to the generated propagation probability map and the tabulated HF shortwave propagation data.

3. A system as defined in claim 1, wherein the data analyzer includes a frequency analyzer to identify the one or more HF shortwave frequencies as one or more clear channels responsive to the data received from the plurality of HF shortwave receive sites and a propagation analyzer configured to generate a propagation probability map of the selected area to be under surveillance.

4. A system as defined in claim 1, wherein the selected area to be under surveillance is divided into a plurality of selected sectors, wherein a fixed-location unit defining a beacon is positioned within each of the plurality of the selected sectors within the selected area to be under surveillance, wherein each beacon transmits a plurality of test signals on one or more HF frequencies responsive to a command initiated by the propagation analyzer and transmitted by the plurality of HF shortwave receive sites through the plurality of HF shortwave antenna arrays, and wherein the plurality of transmitted test signals include a propagation time being detected by the plurality of HF shortwave receive sites through the plurality of HF shortwave antenna arrays.

5. A system as defined in claim 4, wherein the propagation analyzer records the propagation time of the plurality of test signals traveling between the beacon and the plurality of HF shortwave receive sites, and wherein the propagation time defines a reference time to calibrate a distance between the field unit and the HF plurality of shortwave receive sites.

6. A system as defined in claim 4, wherein the frequency analyzer receives and records the one or more HF frequencies associated with the received test signals transmitted by the beacon and received by the greatest number of the plurality of HF shortwave receive sites, and wherein the one or more HF frequencies indicate a frequency for a transmission for the selected sector where the beacon is positioned.

7. A system as defined in claim 6, wherein the transmitted test signals propagate on one or more frequencies from the beacon to two or more HF shortwave receive sites within one hop radii through a plurality of ionospheric layers, wherein the two or more HF shortwave receive sites receive the propagated test signals from the beacon traveling on the one or more frequencies through one of the plurality of ionospheric layers, and wherein the one of the plurality of ionospheric layers define the same ionospheric layer the propagated test signals propagate through.

8. A system as defined in claim 7, wherein each of the plurality of shortwave receive sites comprises:
one or more receivers coupled to the one or more shortwave antenna arrays to receive an encoded HF signal transmitted by the remote field unit through the one or more HF shortwave antenna arrays, wherein the encoded HF signal is transmitted at unpredictable intervals, and wherein the one or more receivers is positioned in communication with one or more processors;
non-transitory memory positioned in communication with the one or more processors to store one or more computer programs therein;
one or more computer programs, defining a beam analyzer, stored in the non-transitory memory and operable on the one or more processors, the beam analyzer having a set of instructions that, when executed by the one or more processors, cause the one or more processors to perform the following operations:
determining a signal level in response to the received signal detected by at least three antenna beams produced by the one or more HF shortwave antenna arrays; and
calculating an angle of arrival of the received signal in response to the determined signal level, wherein the angle of arrival determines direction of arrival of the received signal.

9. A system as defined in claim 8, wherein two or more HF shortwave antenna arrays positioned adjacent each HF shortwave receive site tracks the HF signal transmitted by the remote field unit, wherein the plurality of HF antenna array beams produced by the two or more HF shortwave antenna arrays are directive, wherein the plurality of directive antenna beams are directed towards the tracked HF signal, wherein the two or more shortwave antenna arrays are pointed in such a direction to null out the HF signal, and wherein the location of the null out HF signal determines an angle of direction of the remote field unit.

10. A system as defined in claim 9, wherein the plurality of directive antenna array beams produce a plurality of HF antenna array beam signals, wherein the plurality of the HF antenna array beam signals are transmitted to the geo-location controller via a link connecting each of the HF shortwave receive site and the geo-location controller, wherein the geo-location controller adjusts an amplitude and a phase of the plurality of the HF antenna array beam signals to null out the signal, and wherein the location of the null out HF signal determines the angle of direction of the remote field unit.

11. A system as defined in claim 8, wherein three or more HF shortwave receive sites transmit time arrival data and direction of arrival data to the geo-location controller in response to the received HF signal generated by the remote field unit, the time arrival data being equal to or better than microsecond accuracy, and wherein the geo-location controller is configured to determine the location of the remote field unit based upon the time arrival data and the direction of arrival data.

12. A system as defined in claim 10, wherein the remote field unit comprises (a) either, a desired target expected to be detected to define a friendly remote field unit or (b) a target not expected to be detected to define an unfriendly remote field unit, wherein the remote field unit travels from a first location to a second location within the selected area being under surveillance, wherein the remote field unit transmits a signal to the plurality of shortwave receive sites from the first location and the second location, wherein the received signal associated with the first location and the second location of the traveling remote field unit being communicated to the data analyzer, and wherein the data analyzer determines an instantaneous direction and velocity of the traveling remote field unit.

13. A high frequency (HF) geo-location system for determining a geo-location of a remote field unit, the system comprising:
a plurality of shortwave receive sites positioned to substantially surround, and be distributed within, a selected area to be under surveillance, the selected area having a variation in topography, weather, and obstructions, each of the plurality of shortwave receive sites being positioned in a range between 500 and 1500 miles apart;

one or more shortwave antenna arrays positioned adjacent each shortwave receive site and in communication with one or more transmitters to produce a plurality of antenna array beams therefrom within the surveillance area;

a location unit positioned within the selected area to be under surveillance and remote from each of the plurality of shortwave receive sites thereby to define a remote field unit, the remote field unit also positioned to periodically radiate an HF signal in a selected shortwave radio band detectable by one or more of the plurality of shortwave receive sites through the one or more shortwave antenna arrays; and a network communications and operations controller positioned to gather data received from the plurality of shortwave receive sites and control communications between (i) the plurality of shortwave receive sites through the plurality of antenna arrays and (ii) the remote field unit thereby to define a network operating center (NOC), the NOC further including:

a data analyzer positioned in communication with one or more processors to receive the data from the plurality of shortwave receive sites;

non-transitory memory positioned in communication with the one or more processors to store one or more computer programs therein;

a first set of the one or more computer programs, defining a frequency analyzer, stored in the non-transitory memory and operable on the one or more processors, the frequency analyzer having a set of instructions that, when executed by the one or more processors, cause the one or more processors to perform the following operations:

identifying one or more available shortwave frequencies as one or more clear channels in response to the data received from the plurality of shortwave receive sites through the data analyzer, the one or more clear channels being issued to the remote field unit;

a second set of the one or more computer programs, defining a propagation analyzer, stored in the non-transitory memory and operable on the one or more processors, the propagation analyzer having a set of instructions that, when executed by the one or more processors, cause the one or more processors to perform the following operations:

generating a propagation probability map of the selected area to be under surveillance based upon shortwave propagation data acquired from one or more public sources, and tabularizing the shortwave propagation data; and a geo-location controller in communication with the memory and configured to determine a location of the remote field unit based at least in part upon the identified one or more clear channels assigned to the remote field unit, the generated propagation probability map, and the tabulated shortwave propagation data.

14. A system as defined in claim 13, wherein the selected area to be under surveillance is divided into a plurality of selected sectors, wherein a fixed-location unit defining a beacon is positioned within each of the plurality of the selected sectors within the selected area to be under surveillance, wherein each beacon transmits a plurality of test signals on one or more HF frequencies responsive to a command initiated by the propagation analyzer and transmitted by the plurality of shortwave receive sites through the plurality of shortwave antenna arrays, and wherein the plurality of transmitted test signals include a propagation time being detected by the plurality of shortwave receive sites through the plurality of shortwave antenna arrays.

15. A system as defined in claim 14, wherein the propagation analyzer records the propagation time of the plurality of test signals traveling between the beacon and the plurality of shortwave receive sites, and wherein the propagation time defines a reference time to calibrate a distance between the field unit and the plurality of shortwave receive sites.

16. A system as defined in claim 15, wherein the frequency analyzer receives and records the one or more HF frequencies associated with the received test signals transmitted by the beacon and received by the greatest number of the plurality of shortwave receive sites, and wherein the one or more HF frequencies indicate a frequency for a transmission for the selected sector where the beacon is positioned.

17. A system as defined in claim 16, wherein the transmitted test signals propagate on one or more frequencies from the beacon to two or more shortwave receive sites within one hop radii through a plurality of ionospheric layers, wherein the two or more shortwave receive sites receive the propagated test signals from the beacon traveling on the one or more frequencies through one of the plurality of ionospheric layers, and wherein the one of the plurality of ionospheric layers define the same ionospheric layer the propagated test signals propagate through.

18. A system as defined in claim 17, wherein each of the plurality of shortwave receive sites comprising:

one or more receivers coupled to the one or more shortwave antenna arrays to receive an encoded HF signal transmitted by the remote field unit through the one or more shortwave antenna arrays, wherein the encoded HF signal is transmitted at unpredictable intervals, and wherein the one or more receivers is positioned in communication with one or more processors;

non-transitory memory positioned in communication with the one or more processors to store one or more computer programs therein;

one or more computer programs, defining a beam analyzer, stored in the non-transitory memory and operable on the one or more processors, the beam analyzer having a set of instructions that, when executed by the one or more processors, cause the one or more processors to perform the following operations:

determining a signal level in response to the received signal detected by at least three of the plurality of antenna beams produced by the one or more shortwave antenna arrays; and calculating an angle of arrival of the received signal in response to the determined signal level, wherein the angle of arrival determines direction of arrival of the received signal.

19. A system as defined in claim 18, wherein two or more shortwave antenna arrays positioned adjacent each shortwave receive site tracks the HF signal transmitted by the remote field unit, wherein the plurality of antenna array beams produced by the two or more shortwave antenna arrays are directive, wherein the plurality of directive antenna beams are directed towards the tracked HF signal, wherein the two or more shortwave antenna arrays are pointed in such a direction to null out the HF signal, and wherein the location of the null out HF signal determines an angle of direction of the remote field unit.

20. A system as defined in claim 19, wherein the plurality of directive antenna array beams produce a plurality of antenna array beam signals, wherein the plurality of the antenna array beam signals are transmitted to the geo-location controller via a link connecting each of the shortwave receive site and the geo-location controller, wherein the geo-location controller adjusts an amplitude and a phase of the plurality of the antenna array beam signals to null out the signal, and wherein the location of the null out HF signal determines the angle of direction of the remote field unit.

21. A system as defined in claim 18, wherein three or more shortwave receive sites transmit time arrival data and direction of arrival data to the geo-location controller in response to the received HF signal generated by the remote field unit, the time arrival data being equal to or better than microsecond accuracy, and wherein the geo-location controller is configured to determine the location of the remote field unit based upon the time arrival data and the direction of arrival data.

22. A system as defined in claim 21, wherein the remote field unit comprises (a) either, a desired target expected to be detected to define a friendly remote field unit or (b) a target not expected to be detected to define an unfriendly remote field unit, wherein the remote field unit travels from a first location to a second location within the selected area being under surveillance, wherein the remote field unit transmits a signal to the plurality of shortwave receive sites from the first location and the second location, wherein the received signal associated with the first location and the second location of the traveling remote field unit being communicated to the data analyzer, and wherein the data analyzer determines an instantaneous direction and velocity of the traveling remote field unit.

23. A method to determine a geo-location of a remote field unit using a high frequency (HF) geo-location system, the method comprising:
sending a command by use of a data analyzer to a remote field unit positioned within a selected area under surveillance and substantially surrounded by a plurality of shortwave receive sites thereby to request that the remote field unit transmit an HF signal;
transmitting the HF signal from the remote field unit;
receiving the transmitted HF signal at a plurality of shortwave receive sites through one or more shortwave antenna arrays positioned adjacent the plurality of shortwave receive sites;
communicating data associated with the received HF signal by use of a communication link to a geo-location controller of a network operating center (NOC), positioned remote from the plurality of shortwave receive sites; and
determining a location of the remote field unit responsive to the communicated data by use of the geo-location controller.

24. A method as defined in claim 23, wherein the received HF signal data comprises time arrival data and direction of arrival data of the remote field unit, wherein the time arrival data is equal to or better than microsecond accuracy, wherein the plurality of shortwave receive sites include at least three shortwave receive sites, and wherein the at least three shortwave receive sites from the plurality of shortwave receive sites are used to determine the location of the remote field unit.

25. A method as defined in claim 24, the method further comprising:
transmitting test signals at selected time intervals by use of a fixed-location unit defining a beacon, wherein the beacon is positioned within each of a plurality of selected sectors;
detecting the transmitted test signals at the plurality of shortwave receive sites through the one or more shortwave antenna arrays;
transmitting data associated with the detected test signals to a frequency analyzer by use of the communication link; and
generating an ionospheric layer map responsive to the received data associated with the detected test signals by use of the frequency analyzer.

26. A method as defined in claim 25, the method further comprising:
refining the location of the remote field unit based on the generated ionospheric layer map by use of the geo-location controller;
calculating a propagation time of each of the transmitted test signals transmitted from the beacon to the plurality of shortwave receive sites by use of the geo-location controller; and
storing the propagation time at the geo-location controller to be used as a reference to calibrate the field unit distance from the plurality of shortwave receive sites.

27. A method as defined in claim 23 further comprising:
determining a signal level in response to the received HF signal detected by each of a plurality of antenna array beams produced by the one or more shortwave antenna arrays using a beam analyzer;
comparing the signal level of each of the plurality of antenna array beams;
calculating an angle of arrival of the received HF signal based on the signal level;
communicating the angle of arrival data from each of the plurality of shortwave receive sites to the geo-location controller by use of the communication link; and
refining the location of the remote field unit based on the angle of arrival data from each of the plurality of shortwave receive sites by use of the geo-location controller.

28. A method as defined in claim 23 further comprising:
issuing a command by use of the data analyzer to the remote field unit positioned within the selected area to be under surveillance, wherein the command includes a digital packet;
requesting that the remote field unit to transmit a pulse in response to the issued command;
transmitting the pulse for the remote field unit on one or more frequencies, wherein the one or more frequencies are in a 3 Megahertz to 30 Megahertz frequency band;
detecting the transmitted pulse at the plurality of shortwave receive sites through the one or more shortwave antenna arrays; and
forwarding data associated with the received pulse to the geo-location controller by use of the communication link.

* * * * *